United States Patent [19]
Jin

[11] Patent Number: 5,970,234
[45] Date of Patent: Oct. 19, 1999

[54] PCI BUS ARBITER AND A BUS CONTROL SYSTEM HAVING THE SAME

[75] Inventor: Sung-Kon Jin, Uiwang-si, Rep. of Korea

[73] Assignee: SamSung Electronics Co., Ltd., Suwon, Rep. of Korea

[21] Appl. No.: 08/792,424

[22] Filed: Jan. 30, 1997

[30] Foreign Application Priority Data

Jan. 30, 1996 [KR] Rep. of Korea .................. 96-2136

[51] Int. Cl.⁶ .................. G06F 13/36; G06F 13/37
[52] U.S. Cl. .................. 395/291; 395/728; 395/731; 395/308
[58] Field of Search .................. 395/287, 291, 395/294, 296, 307, 303, 306, 308, 309, 728, 732

[56] References Cited

U.S. PATENT DOCUMENTS

| | | | |
|---|---|---|---|
| 5,392,407 | 2/1995 | Heil et al. | 395/293 |
| 5,446,869 | 8/1995 | Padgett et al. | 395/500 |
| 5,450,551 | 9/1995 | Amini et al. | 395/299 |
| 5,471,590 | 11/1995 | Melo et al. | 395/288 |
| 5,524,235 | 6/1996 | Larson et al. | 711/151 |
| 5,546,546 | 8/1996 | Bell et al. | 395/292 |
| 5,560,016 | 9/1996 | Fiebrich et al. | 395/728 |
| 5,594,882 | 1/1997 | Bell | 711/212 |
| 5,608,884 | 3/1997 | Potter | 395/309 |
| 5,630,145 | 5/1997 | Chen | 395/750.04 |

OTHER PUBLICATIONS

Bit 3 Computer Corporation, Product Summary, Jan. 1997, pp. 6 and 7 including cover page.

Primary Examiner—Ayaz R. Sheikh
Assistant Examiner—Xuong M. Chung-Trans
Attorney, Agent, or Firm—Robert E. Bushnell, Esq.

[57] ABSTRACT

A PCI bus arbiter is provided as an additional PCI bus in PCI peer-to-peer bus bridge system. A bus control system having the PCI bus arbiter is also provided. The bus control system includes bus masters, a first PCI bus bridge, a second PCI bus bridge, an EISA/ISA bus bridge for changing structures of signals from the bus masters to be suitable for corresponding bus, a first arbiter in a main chip set, and a second arbiter for arbitration process. The second arbiter includes an edge detecting state machine which detects whether a PCI bus is accessed by a bus master, and produces a frame-signal which changes a logic state thereof according to an access condition of the PCI bus. The second arbiter may also include a priority resolve state machine which receives the frame-signal and produces priority values which determine an order of bus masters to use the PCI bus, wherein the priority values are changed according to the frame-signal. The second arbiter can include a hand shake state machine which produces and outputs grant-signals to grant authority to use the PCI bus to bus masters according to the priority value.

18 Claims, 7 Drawing Sheets

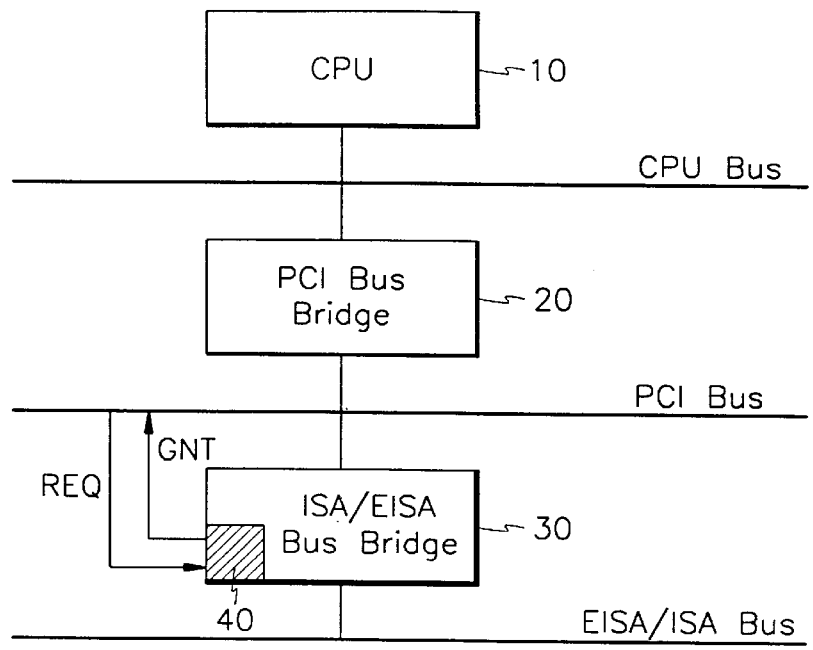
Fig. 1 *(Prior Art)*
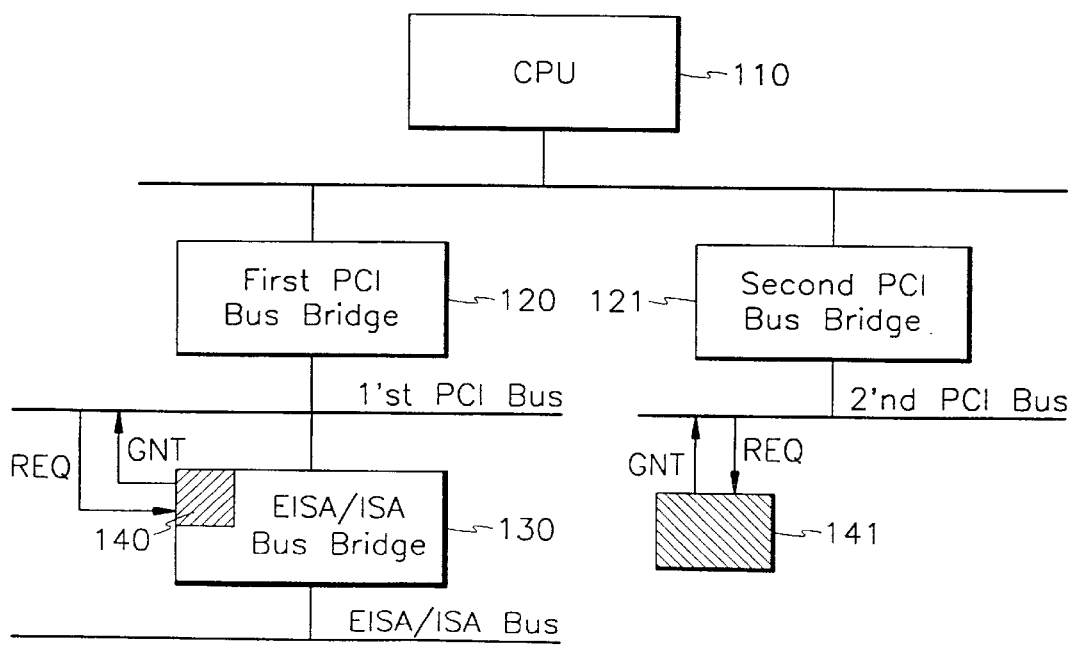
Fig. 2

Fig. 5

| Initial State | | Input | | Next State | | Output |
|---|---|---|---|---|---|---|
| Q1 | Q0 | RESETL | PBBL | Q1 | Q0 | FHLE |
| 0 | 0 | 0 | X | 0 | 0 | 0 |
| 0 | 0 | 1 | 0 | 1 | 1 | 0 |
| 0 | 0 | 1 | 1 | 0 | 1 | 0 |
| 0 | 1 | 0 | X | 0 | 0 | 0 |
| 0 | 1 | 1 | 0 | 1 | 1 | 1 |
| 0 | 1 | 1 | 1 | 0 | 1 | 0 |
| 1 | 1 | 0 | X | 0 | 0 | 0 |
| 1 | 1 | 1 | 0 | 1 | 1 | 0 |
| 1 | 1 | 1 | 1 | 0 | 1 | 0 |
| 1 | 0 | X | X | 0 | 0 | 0 |

Q0:=!Q1*RESETL # Q0*RESETL
Q1:=!Q1*RESETL * !PBBL#Q0*RESETL*!PBBL
FHLE:=!Q1*Q0*RESETL*!PBBL

PCI BUS ARBITER AND A BUS CONTROL SYSTEM HAVING THE SAME

CLAIM OF PRIORITY

This application makes reference to, incorporates the same herein, and claims all benefits accruing under 35 U.S.C. §119 from an application entitled a PCI Bus Arbiter and a Bus Control System Having the Same earlier filed in the Korean Industrial Property Office on 30th of Jan., 1996 and there duly assigned Ser. No. 96-2136 by that Office.

BACKGROUND OF THE INVENTION

1. Field of the Invention

The present invention relates to a PCI bus control system. More particularly, the present invention relates to a PCI bus control system having a PCI bus arbiter.

2. Description of the Prior Art

When more than one bus master in a computer system simultaneously request to use a PCI bus, an arbiter selects a bus master and grants an authority to use the PCI bus to the selected bus master. Thus, the arbiter arranges the sequence to use the bus for the bus masters. Typically, in a main chip set of computer system used for the arbitration processes, a separate arbiter for each of the arbitration processes is not used in the art. On this matter, an exemplar of the contemporary practice is Heil et al. (U.S. Pat. No. 5,392,407, Multi-Port Processor With Peripheral Component Interconnect Port and RAMbus Port, Feb. 21, 1995) discussing a dual-port processor architecture with a first port interfacing to a PCI bus and a second port port interfacing to a RAMBUS channel. Pidgett et al. (U.S. Pat. No. 5,446,869, Configuration And RAM/ROM Control Of PCI Extension Card Residing On MCA Adapter Card, Aug. 29, 1995) discussing a method and apparatus for enabling configuration of a PCI daughter card resing on an MCA adapter card. A PCI/MCA bridge is provided for interfacing the MCA system bus with the PCI bus of the adapter card. Amini et al. (U.S. Pat. No. 5,450,551, System Direct Memory Access (DMA) Support Logic For PCI Based Computer System, Sep. 21, 1995) discussing computer system having a direct memory access (DMA) support mechanism. The computer system includes a central processing unit, a host bridge, an input/output bridge, and an arbitration logic circuit. Based on my study of these exemplars of the contemporary practice and the art, I believe that there is a need for an effective and improved PCI bus control system having a PCI bus arbiter.

SUMMARY OF THE INVENTION

Thus, it is an object of the present invention to provide an improved PCI bus control process and system.

It is another object to provide an improved PCI bus control process and system having a PCI bus arbiter.

It is still another object to provide an improved PCI bus arbiter able to acommodate an additional PCI bus in a PCI peer-to-peer bus bridge system.

It is yet another object to provide an improved PCI bus arbiter able to acommodate an additional PCI bus in conformance with a PCI peer-to-peer bus bridge system, where the main chip set performs the functions of an arbiter for the one PCI bus as in a typical contemporary practice.

It is still yet another object to provide an improved bus control system which uses the PCI bus arbiter in PCI peer-to-peer bridge system.

The bus control system of present invention may include a central processing unit having functions of processing or manipulating data which are inputted to a computer system, a first PCI bus bridge which changes structure of signals from the bus masters to be suitable for a first PCI bus a second PCI bus bridge which changes structure of signals from the bus masters to be suitable for a second PCI bus, and an EISA/ISA bus bridge which changes structure of signals from the bus masters to be suitable for an EISA/ISA bus. The bus control system may also include a first arbiter in a main chip set which receives first request signals requesting an authority to use the first PCI bus from the bus masters, and selects a first bus master from the bus masters, and produces a first grant signal to authorize the first bus master to use the first PCI bus. The bus control system can include a second arbiter which receives second request signals requesting an authority to use the second PCI bus from the bus masters, and selects a second bus master from the bus masters, and produces a second grant signal to authorize the second bus master to use the second PCI bus.

This second arbiter may include an edge detecting state machine which detects whether a PCI bus is accessed by a bus master, and produces a frame-signal which changes an logic state thereof according to an access condition of the PCI bus. The second arbiter may also include a priority resolve state machine which receives the frame-signal and produces priority values which determine an order for bus masters to use the PCI bus, where the priority values are changed according to the frame-signal. The second arbiter may further include a hand shake state machine which produces grant-signals to grant authority to use the PCI bus to bus masters according to the priority value.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 1 is a block diagram illustrating a contemporary bus control system;

FIG. 2 is a block diagram illustrating a bus control system for an embodiment of the present invention;

FIG. 5 is a table illustrating the states and FHLE signal changes of the edge detecting state machine of an embodiment of the present invention, showing the states according to the PBBL signal;

DETAILED DESCRIPTION OF THE PREFERRED EMBODIMENT

Figure 3:
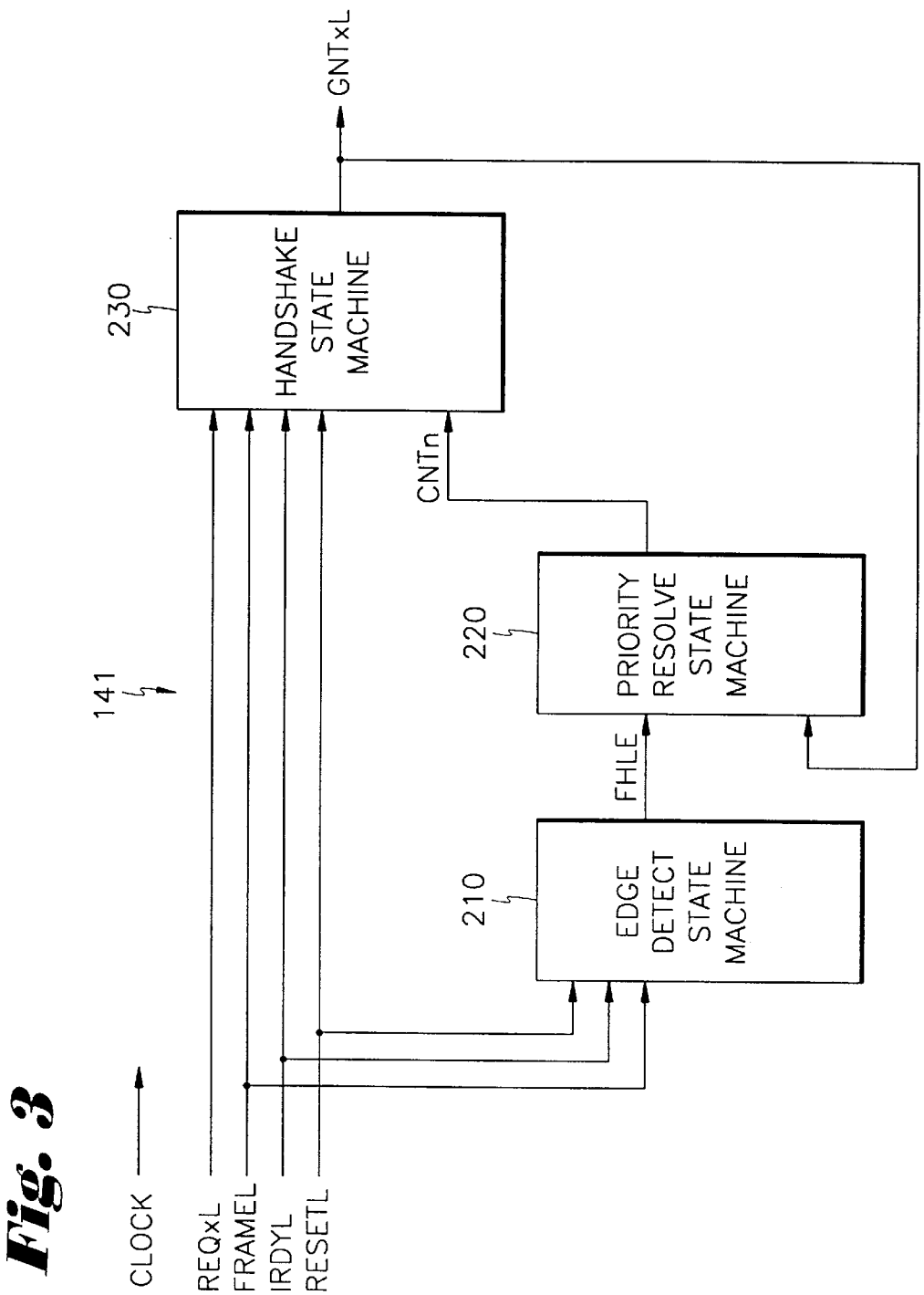
FIG. 3 is a block diagram illustrating an arbiter of an embodiment of the present invention.

Turning now to the drawings, the arbitration process of the contemporary practice will be described below in conjunction with the FIG. 1, which shows a block diagram of a contemporary bus control system.

As shown in FIG. 1, the contemporary bus control system may include a central processing unit 10 (hereinafter CPU), a PCI bus bridge 20, EISA/ISA bus bridge 30 and a PCI bus arbiter 40. The CPU 10 has functions of processing or manipulating data which are inputted to a computer system. The PCI bus bridge 20, where the term "PCI" is an abbreviation of peripheral component interconnect, has the role of changing the structure of signals of CPU so that the structure of signals is suitable for the PCI bus. The EISA/ISA bus bridge 30 has the role of changing the structure of signals of CPU to be suitable for the EISA/ISA bus.

In operation, the CPU 10 and a plurality of peripheral devices (not shown) work as bus masters which use the PCI bus in common, thereby requesting to the arbiter 40 for an authority to use the PCI bus. Hereinafter, the CPU 10 and the plurality of peripheral devices are simply referred as bus masters. If the authorities are sequentially requested by the bus masters, the arbiter 40 grants the authorities to each bus master sequentially according to the order of requests. However, if the authorities are requested simultaneously by the bus masters, the arbiter 40 determines a bus master which will use the bus first and grants the priority to use the bus to the selected bus master. In FIG. 1, the reference character REQ means request signal of the bus masters, and GNT means grant signal of the arbiter 40.

In a contemporary computer system, the function of arbiter 40 is provided by the main chip set. However, the contemporary arbiter 40 in a main chip set is designed to be used only when one PCI bus is used in the computer system. Therefore, when a number of PCI buses are used in the computer system, such as in a peer-to-peer bridge type bus system, additional arbiters are needed because the arbiter 40 in the main chip set can support limited number of the bus masters. If a plurality of main chip sets are used to surmount these problems, there can be collisions of address and data between the main chip sets. Thus, it would be uneconomical to use the main chip set as an arbiter.

FIG. 2 shows an another bus control system. As shown in FIG. 2, the bus control system of the present invention comprises a CPU 110, a first PCI bus bridge 120, a second PCI bus bridge 121, an EISA/ISA bus bridge 130, a first arbiter 140 and a second arbiter 141. The CPU 110 has functions of processing or manipulating data which are inputted to a computer system (not shown). The first PCI bus bridge 120 changes structure of signals from the bus masters to be suitable for a first PCI bus, and the second PCI bus bridge 121 changes structure of signals from the bus masters to be suitable for a second PCI bus. The EISA/ISA bus bridge 130 changes structure of signals from the bus masters to be suitable for an EISA/ISA bus.

The first arbiter 140 in a main chip set receives a first request signal which requests an authority to use the first PCI bus from the bus masters, and selects a first bus master from the bus masters to access the first PCI bus, and produces a first grant signal to authorize the first bus master to access the first PCI bus. As shown in FIG. 2, the first arbiter 140 is in the main chip set of the computer system with the EISA/ISA bus bridge 130.

The second arbiter 141 receives a second request signal which requests an authority to use the second PCI bus from the bus masters, and selects a second bus master from the bus masters, and produces a second grant signal to authorize the second bus master to access the second PCIbus. As clearly shown in FIG. 2, a separate logic circuit is provided for the second arbiter 141 in the present invention.

As shown in FIG. 3, the second arbiter 141 comprises an edge detect state machine 210, a priority resolve state machine 220 and a hand shake state machine 230. During the overall operation, a bus master requests an authority to use the PCI bus by setting the request signal REQxL to low logic level, and accesses the PCI bus if the grant signal GNTxL is in low logic state. If only one bus master produces the request signal REQxL of low logic level, the second arbiter 141 produces and sends the grant signal GNTxL of low logic state to the master. However, when a plurality of masters produce the request signals REQxL of low logic level, the second arbiter 141 produces and sends the grant signals GNTxL of low logic state to each bus master sequentially according to each bus master's priority to use the bus. The priorities for the bus masters are determined by the priority resolve state machine 220. The arbitration protocol of the second arbiter 141 uses a specification defined in the PCI bus specification. The edge detect state machine 210 detects the changes of the logic states of a FRAMEL signal and a IRDYL signal. The logic state of the FRAMEL signal represents whether the PCI bus is used by a bus master, and is in low logic state when the PCI bus is used by a bus master. The IRDYL signal represents the condition of an initiator. When a PBBL signal, an logical AND result of the FRAMEL signal and the IRDYL signal is changed from high to low logic state, namely when an edge of the PBBL signal is detected, the edge detect state machine 210 changes the logic state of a FHLE signal, and outputs the FHLE signal to the priority resolve state machine 220. The priorities for the bus masters are changed according to the FHLE signal, that is, according to the FRAMEL signal.

Figure 4:
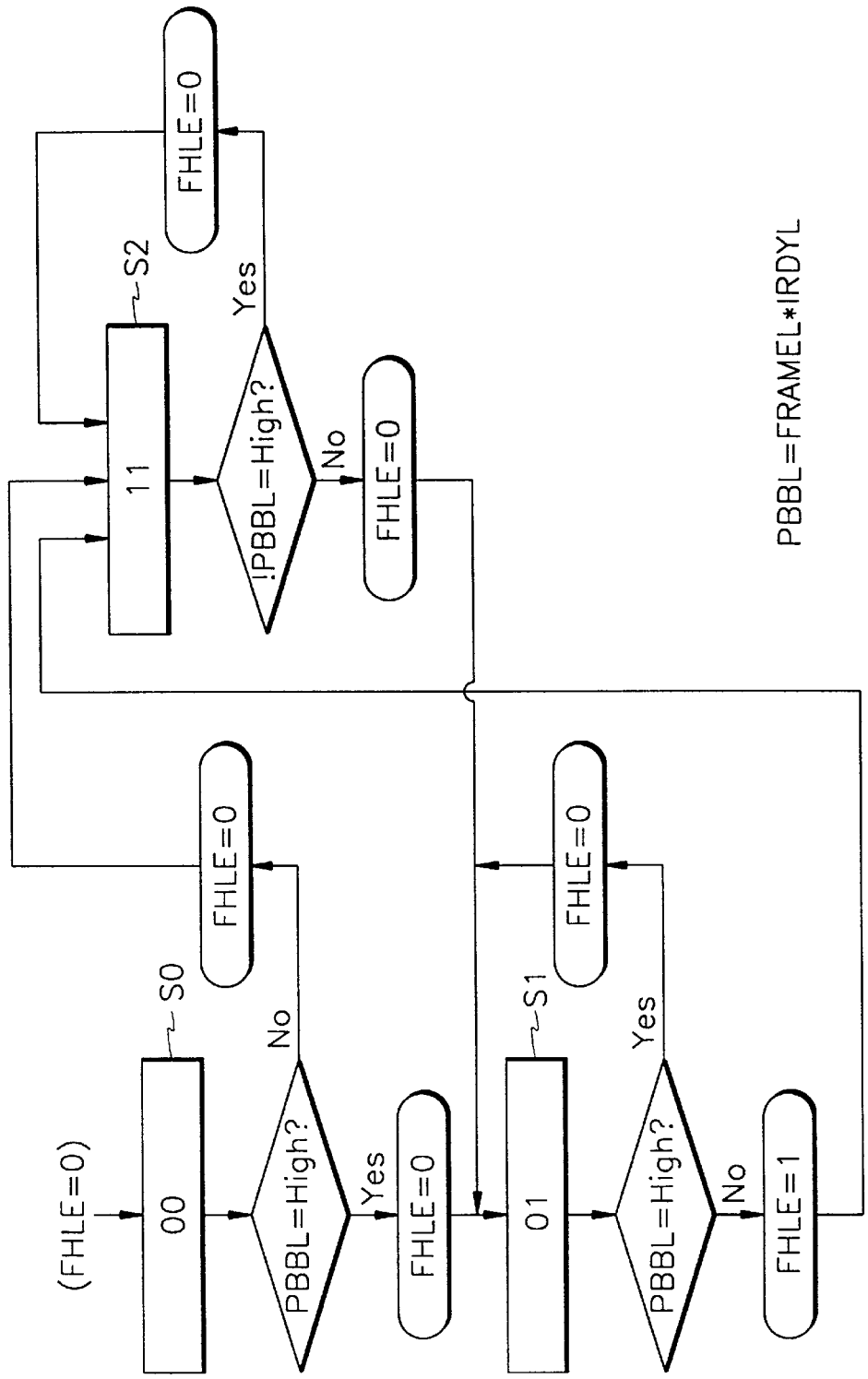
FIG. 4 shows a flow chart illustrating the process to produce FHLE signal and the state change of the edge detecting state machine of an embodiment of the present invention.

The flow chart and the state diagram of the edge detect state machine 210 to produce the FHLE signal are shown in FIGS. 4 and 5, respectively. In FIG. 5, the two binary numbers Q1 and Q0 represent the states of edge detect state machine 210. As shown in FIGS. 4 and 5, if the state of the edge detect state machine 210 is in S0 state at initial stage wherein Q1 and Q0 are both zero, the edge detect state machine 210 sets the FHLE signal to 0 value, and changes its state to S1 or S2 according to the logic state of the inputted PBBL signal. In S1 state, if the inputted PBBL signal is in High logic state, the edge detect state machine 210 sets the FHLE signal to 0 value, and changes its state to S1. If the inputted PBBL signal is in Low logic state at S1 state, the edge detect state machine 210 sets the FHLE signal to 1 value, and changes its state to S2. In FIG. 5, the symbol X represents that the state of the signal does not effect to the output signal. As shown in FIG. 5, the RESETL signal of low logic state resets the FHLE signal to 0 regardless of the state of PBBL signal. When the Q1 and Q2 are 1 and 0 respectively, the FHLE signal becomes to 0 and the state of the edge detect state machine 210 is changed to S0 state regardless of the input signal.

As shown in FIG. 3, the priority resolve state machine 220 produces priority values CNTn which determines the orders of bus masters to use the PCI bus when a plurality of bus masters request the authority to use the PCI bus. A round robin method, a fixed priority method and a least recently used method can be used to determine the priority of the bus masters in the priority resolve state machine 220.

Figure 6:
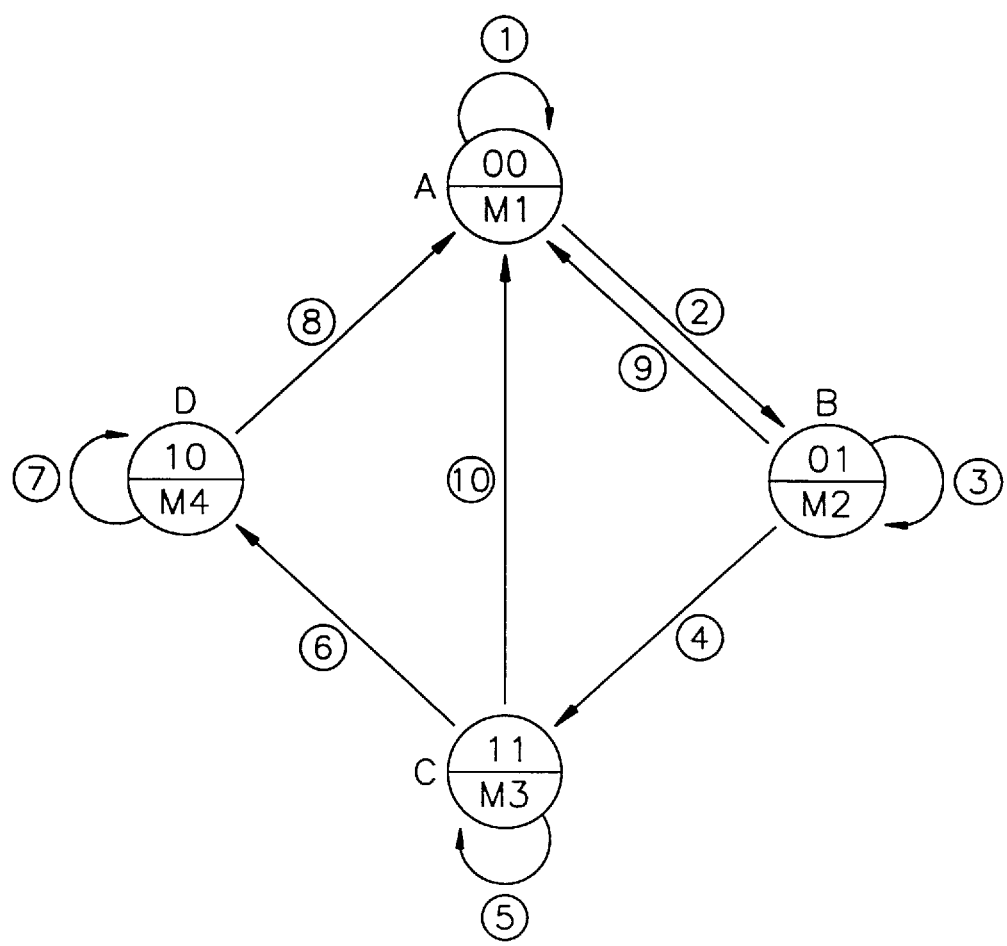
FIG. 6 shows a state diagram of the priority resolve state machine of an embodiment of the present invention, the priorities being resolved according to the round robin method.

The round robin method for bus masters can be as follows FIG. 6 shows a state diagram of the priority resolve state machine 220 according to the round robin method. The priority of the bus masters is determined by the priority value CNTn which represents the states of the priority resolve state machine 220. The numerals 00, 01, 11 and 10 in FIG. 6 represent the state of priority resolve state machine 220. For example, as shown in FIG. 6, if the priority resolve state machine 220 is in the state of 11, the master M3 has the first priority, and the master M4 has the second priority. If the master M3 finishes to use the PCI bus, the master M4 has the next priority to access to the PCI bus and the state of the priority resolve state machine 220 is changed to state 10. In the state 11, if a RESETL signal is inputted, the state of the priority resolve state machine 220 changes to 00 state, then the master M1 has the first priority. Each arrow in FIG. 6 represents the change of states according to the following conditions in the round robin method. In following conditions, symbol * and # represent logic AND and OR results, respectively.

| VALUE | | PRIORITY | | | |
|---|---|---|---|---|---|
| CNT1 | CNT0 | 1'ST | 2'ND | 3'RD | 4'TH |
| 0 | 0 | M1 | M2 | M3 | M4 |
| 0 | 1 | M2 | M3 | M4 | M1 |
| 1 | 1 | M3 | M4 | M1 | M2 |
| 1 | 0 | M4 | M1 | M2 | M3 |

```
RESETL * !FHLE # !RESETL
(!GNT1L # !GNT2L # !GNT3L # !GNT4L) * FHLE * RESETL
RESETL * !FHLE
(!GNT1L # !GNT2L # !GNT3L # !GNT4L) * FHLE * RESETL
RESETL * !FHLE
(!GNT1L # !GNT2L # !GNT3L # !GNT4L) * FHLE * RESETL
RESETL * !FHLE
(!GNT1L # !GNT2L # !GNT3L # !GNT4L) * FHLE * RESETL # !RESETL
!RESETL
!RESETL
```

In this embodiment, the sequence to use the PCI bus for the 4 bus master at each state of the priority resolve state machine 220 is shown in the following table.

The following is an example of the round robin program for the priority resolve state machine 220.

```
"INPUT
    CLOCK, RESETL, FRAMEL, IRDYL, 0EL PIN 1, 2, 3, 4, 11;
    GNT1L, GNT2L, GNT3L, GNT4L   PIN 5, 6, 7, 9;
"OUTPUT
    CNT1, CNT 0  PIN 18,19 ISTYPE 'REG_D';
    FHLE, Q0, Q1  PIN 13,14, 15 ISTYPE 'REG_D'
    H,L,X,CLK,Z= 1,0,.x.,.c.,.z.;
"STATE REGISTER ASSIGNEMNTS
    CNT= [CNT1, CNT0]
    A= [0,0];
    B= [0,1];
    C= [1,1];
    D= [1,0];
    PBBL macro{(FRAMEL & IRDYL)}
EQUATIONS
    [Q1,Q0].c = CLOCK;
    [CNT1,CNT0].c = CLOCK;
    [FHLE].c = CLOCK;
    Q1 := !Q1 & RESETL & !PBBL # Q0 & RESETL & !PBBL;
    Q0 := !Q1 & RESETL # Q0 & RESETL;
    FHLE:= !Q1 & Q0 & RESETL & !PBBL;
STATE_DIAGRAM CNT
    STATE A:
    IF((!GNT1L # !GNT2L # !GNT3L # !GNT4L)& FHLE & RESETL) THEN B
    ELSE IF (RESETL & !FHLE) THEN A
    ELSE A;
    STATE B:
    IF((!GNT1L # !GNT2L # !GNT3L # !GNT4L)& FHLE & RESETL) THEN C
    ELSE IF (RESETL & !FHLE) THEN B
    ELSE A;
    STATE C:
    IF((!GNT1L # !GNT2L # !GNT3L # !GNT4L)& FHLE & RESETL) THEN D
    ELSE IF (RESETL & !FHLE) THEN C
    ELSE A;
    STATE D:
    IF((!GNT1L # !GNT2L # !GNT3L # !GNT4L)& FHLE & RESETL) THEN A
    ELSE IF (RESETL & !FHLE) THEN D ELSE A;
    END ROBIN
```

The priority value CNTn is outputted to the hand shake state machine 230 to produce the grant signal GNTxL to grant an authority to use the PCI bus to the masters sequentially. The hand shake state machine 230 monitors the condition of PCI bus, and produces and outputs the GNTNL signal to the n-th bus master having the highest priority according to the priority value CNTn when a plurality of bus masters request the authority. If any bus master dose not request to use the PCI bus (that is, Idle condition), the hand shake state machine 230 grants the authority to the bus master which uses the PCI bus recently.

Figure 7:
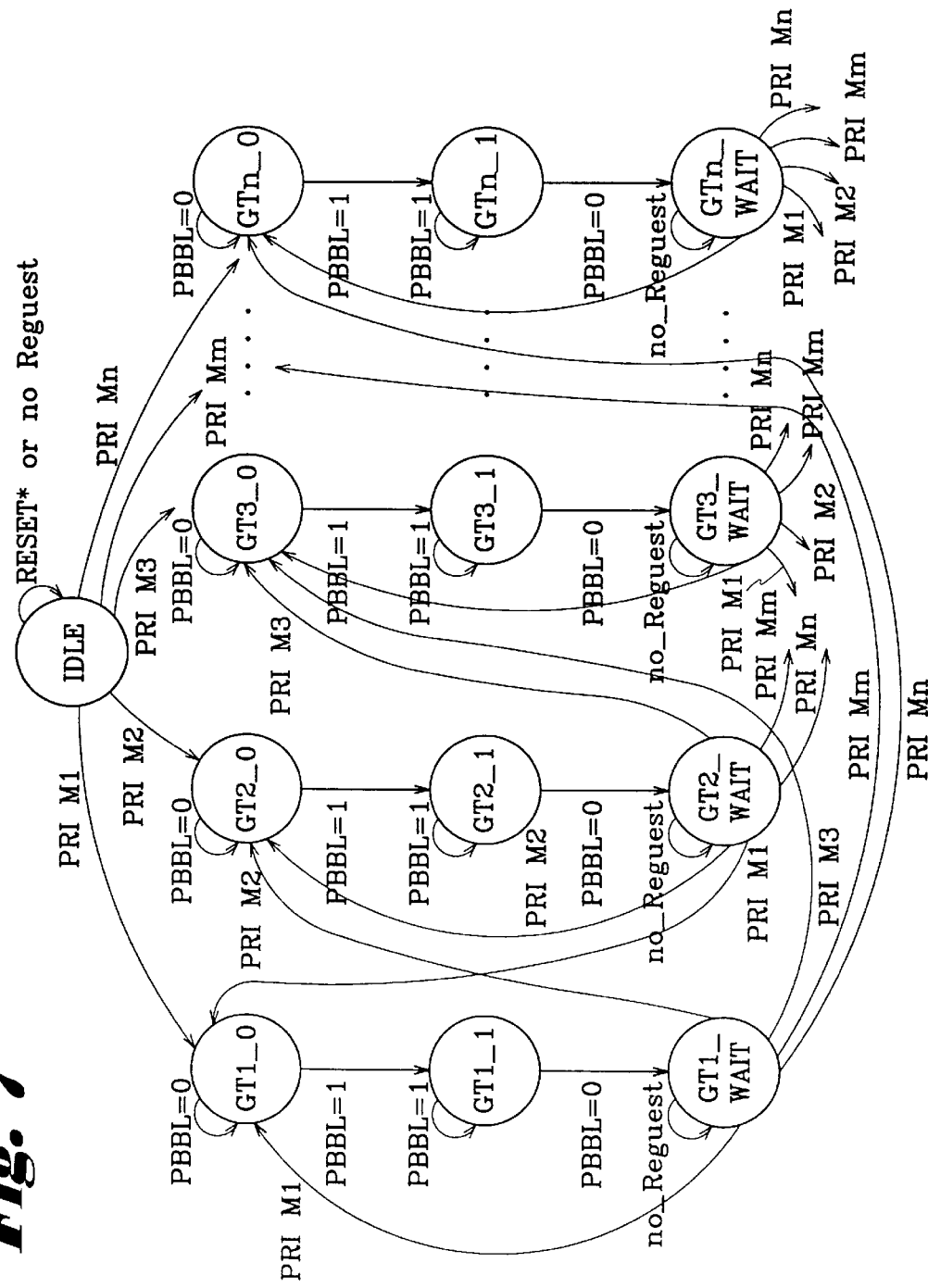
FIG. 7 represents state diagrams for the hand shake state machine of an embodiment of the present invention, suitable for n bus masters.
Figure 8:
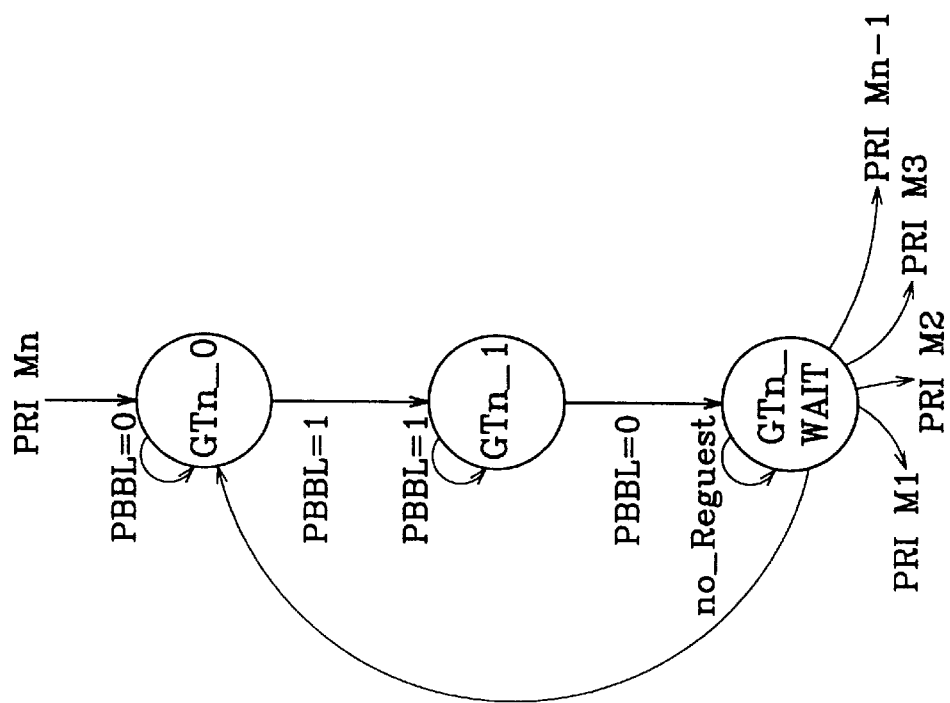
FIG. 8 is a state diagram for the hand shake state machine of an embodiment of the present invention, suitable for one bus master.

FIG. 7 represents state diagrams for the hand shake state machine 230 for n bus masters. And FIG. 8 is a state diagram for one bus master. In FIG. 7, PRI M1 means that the bus master M1 has the priority to use the PCI bus, and the PRI M1 signal is produced according to the priority value CNTn of the priority resolve state machine 220. The term "GT"s in FIG. 7 represent the states of the hand shake state machine 230. As shown in FIG. 7, if the number of the bus master are increased, the number of the state diagram are increased accordingly. The enclosed list is a truth table for the state change of the hand shake state machine 230 for 5 bus masters. The following program will illustrate the function of the hand shake state machine 230 and the state diagrams in FIG. 7.

```
MODULE ARBITER4M
ARBIT4M      DEVICE 'P22c10c';
"INPUT
    CLOCK, RESERTL, FRAMEL, IRDYL    PIN 2, 3, 4, 5;
    REQ1L, REQ2L, REQ3L, REQ5L    PIN 7, 9, 10, 11;
    CNT0, CNT1      PIN 12, 13;
"OUTPUT
    GNT1L, GNT2L, GNT3L, GNT5L PIN 18,25,26,27 ISTYPE 'REG_D'
    ST0, ST1, ST2, ST3    PIN 19,23,21,20 ISTYPE 'REG_D'
    H,L,X,clk,Z=1,0,.X.,.c.,.z.;
    PBBL macro {(FRAMEL & IRDYL)}
EQUATIONS
    [ST3,ST2,ST1,ST0].c = CLOCK;
    [ST3,ST2,ST1,ST0].ar = !RESETL;
    [GNT5L,GNT3L,GNT2L,GNT1L].c = CLOCK;
    [GNT5L,GNT3L,GNT2L,GNT1L].pr = !RESETL;
ST3 := !ST3 & !ST2 & !ST0 & REQ5L & !REQ3L & REQ2L & REQ1L
# !ST3 & !ST2 & !ST0 & !REQ5L & REQ3L & REQ2L & REQ1L
# !ST3 & !ST2 & !ST0 & !REQ5L & REQ1L & !CNT1 & !CNT0
# !ST3 & !ST2 & !ST0 & !REQ3L & REQ1L & !CNT1 & !CNT0
# !ST3 & !ST2 & !ST0 & !REQ5L & REQ2L & REQ1L & !CNT1 & CNT0
# !ST3 & !ST2 & !ST0 & !REQ3L & CNT1 & !CNT0
# !ST3 & !ST2 & !ST0 & !REQ5L & CNT1 & CNT0
# !ST3 & !ST2 & !ST0 & !REQ3L & CNT1 & CNT0
# ST3 & !ST2 & !ST1 & !ST0 & GNT5L & !GNT3L & GNT2L & GNT1L & !PBBL
# ST3 & !ST2 & !ST1 & !ST0 & !GNT5L & GNT3L & GNT2L & GNT1L & !PBBL;
ST2 := !ST3 & !ST2 & !ST0 & REQ5L & REQ3L & REQ2L & !REQ1L
# !ST3 & !ST2 & !ST0 & REQ5L & REQ3L & !REQ2L & REQ1L
# !ST3 & !ST2 & !ST0 & !REQ1L & !CNT1 & !CNT0
# !ST3 & !ST2 & !ST0 & !REQ2L & !CNT1 & CNT0
# !ST3 & !ST2 & !ST0 & !REQ1L & !CNT1 & CNT0
# !ST3 & !ST2 & !ST0 & REQ3L & !REQ2L & CNT1 & !CNT0
# !ST3 & !ST2 & !ST0 & REQ3L & !REQ1L & CNT1 & !CNT0
# !ST3 & !ST2 & !ST0 & REQ5L & REQ3L & !REQ2L & CNT1 & CNT0
# !ST3 & ST2 & !ST1 & !ST0 & GNT5L & GNT3L & GNT2L & !GNT1L & !PBBL
# !ST3 & ST2 & !ST1 & !ST0 & GNT5L & GNT3L & !GNT2L & GNT1L & !PBBL;
ST1 := !ST3 & !ST2 & !ST1 & ST0 & GNT5L & GNT3L & GNT2L & !GNT1L & !PBBL
# !ST3 & !ST2 & ST1 & ST0 & GNT5L & GNT3L & GNT2L & !GNT1L
# !ST3 & !ST2 & ST1 & !ST0 & GNT5L & GNT3L & GNT2L & !GNT1L & REQ5L & REQ3L
  & REQ2L & REQ1L
# !ST3 & !ST2 & !ST1 & ST0 & GNT5L & GNT3L & !GNT2L & GNT1L & !PBBL
# !ST3 & !ST2 & ST1 & ST0 & GNT5L & GNT3L & !GNT2L & GNT1L
# !ST3 & !ST2 & ST1 & !ST0 & GNT5L & GNT3L & !GNT2L & GNT1L & REQ5L & REQ3L
  & REQ2L & REQ1L
# !ST3 & !ST2 & !ST1 & ST0 & GNT5L & !GNT3L & GNT2L & GNT1L & !PBBL
# !ST3 & !ST2 & ST1 & ST0 & GNT5L & !GNT3L & GNT2L & GNT1L
# !ST3 & !ST2 & ST1 & !ST0 & GNT5L & !GNT3L & GNT2L & GNT1L & REQ5L & REQ3L
  & REQ2L & REQ1L
# !ST3 & !ST2 & !ST1 & ST0 & !GNT5L & GNT3L & GNT2L & GNT1L & !PBBL
# !ST3 & !ST2 & ST1 & ST0 & !GNT5L & GNT3L & GNT2L & GNT1L
# !ST3 & !ST2 & ST1 & !ST0 & !GNT5L & GNT3L & GNT2L & GNT1L & REQ5L & REQ3L
  & REQ2L & REQ1L;
ST0 := !ST3 & ST2 & !ST1 & !ST0 & GNT5L & GNT3L & GNT2L & !GNT1L & PBBL
# !ST3 & !ST2 & !ST1 & ST0 & GNT5L & GNT3L & GNT2L & !GNT1L
# !ST3 & ST2 & !ST1 & !ST0 & GNT5L & GNT3L & !GNT2L & GNT1L & PBBL
# !ST3 & !ST2 & !ST1 & ST0 & GNT5L & GNT3L & !GNT2L & GNT1L
# ST3 & !ST2 & !ST1 & !ST0 & GNT5L & !GNT3L & GNT2L & GNT1L & PBBL
# !ST3 & !ST2 & !ST1 & ST0 & GNT5L & !GNT3L & GNT2L & GNT1L
# ST3 & ST2 & !ST1 & !ST0 & !GNT5L & GNT3L & GNT2L & GNT1L & PBBL
# !ST3 & !ST2 & !ST1 & ST0 & !GNT5L & GNT3L & GNT2L & !GNT1L;!GNT5L := !ST3 &
  !ST2 & !ST0 & !REQ5L & REQ3L & REQ2L & REQ1L
# !ST3 & !ST2 & !ST0 & !REQ5L & REQ1L & !CNT1 & !CNT0    # !ST3 & !ST2 & !ST0 &
  !REQ5L & REQ2L & REQ1L & !CNT1 & CNT0
```

-continued

```
# !ST3 & !ST2 & !ST0 & !REQ5L & CNT1 & CNT0
# ST3 & !ST2 & !ST1 & !ST0 & !GNT5L & GNT3L & GNT2L & GNT1L
# !ST3 & !ST2 & !ST1 & ST0 & !GNT5L & GNT3L & GNT2L & GNT1L
# !ST3 & !ST2 & ST1 & !ST0 & !GNT5L & GNT3L & GNT2L & GNT1L & REQ5L & REQ3L
  & REQ2L & REQ1L
# !ST3 & !ST2 & ST1 & ST0 & !GNT5L & GNT3L & GNT2L & GNT1L;!GNT3L := !ST3 & !ST2
  & !ST0 & REQ5L & !REQ3L & REQ2L & REQ1L
# !ST3 & !ST2 & !ST0 & REQ5L & !REQ3L & REQ1L & !CNT1 & !CNT0
# !ST3 & !ST2 & !ST0 & !REQ3L & CNT1 & !CNT0
# !ST3 & !ST2 & !ST0 & REQ5L & !REQ3L & CNT1 & CNT0
# ST3 & !ST2 & !ST1 & !ST0 & GNT5L & !GNT3L & GNT2L & GNT1L
# !ST3 & !ST2 & !ST1 & ST0 & GNT5L & !GNT3L & GNT2L & GNT1L
# !ST3 & !ST2 & ST1 & !ST0 & GNT5L & !GNT3L & GNT2L & GNT1L & REQ5L & REQ3L
  & REQ2L & REQ1L
# !ST3 & !ST2 & ST1 & ST0 & GNT5L & !GNT3L & GNT2L & GNT1L;!GNT2L := !ST3 & !ST2
  & !ST0 & REQ5L & REQ3L & !REQ2L & REQ1L
# !ST3 & !ST2 & !ST0 & !REQ2L & !CNT1 & !CNT0
# !ST3 & !ST2 & !ST0 & REQ3L & !REQ2L & CNT1 & !CNT0
# !ST3 & !ST2 & !ST0 & REQ5L & REQ3L & !REQ2L & CNT1 & CNT0
# !ST3 & ST2 & !ST1 & !ST0 & GNT5L & GNT3L & !GNT2L & GNT1L
# !ST3 & !ST2& !ST1 & ST0 & GNT5L & GNT3L & !GNT2L & GNT1L
# !ST3 & !ST2 & ST1 & !ST0 & GNT5L & GNT3L & !GNT2L & GNT1L & REQ5L & REQ3L
  & REQ2L & REQ1L
# !ST3 & !ST2 & ST1 & ST0 & GNT5L & GNT3L & !GNT2L & GNT1L;!GNT1L := !ST3 & !ST2
  & !ST0 & REQ5L & REQ3L & REQ2L & !REQ1L
# !ST3 & !ST2 & !ST0 & !REQ1L & !CNT1 & !CNT0
# !ST3 & !ST2 & !ST0 & REQ2L & !REQ1L & !CNT1 & CNT0
# !ST3 & !ST2 & !ST0 & REQ3L & REQ2L & !REQ1L & CNT1 & CNT0
# ST3 & !ST2 & !ST1 & !ST0 & GNT5L & GNT3L & GNT2L & !GNT1L
# !ST3 & !ST2 & !ST1 & ST0 & GNT5L & GNT3L & GNT2L & !GNT1L
# !ST3 & !ST2 & ST1 & !ST0 & GNT5L & GNT3L & GNT2L & !GNT1L & REQ5L & REQ3L
  & REQ2L & REQ1L
# !ST3 & !ST2 & ST1 & ST0 & GNT5L & GNT3L & GNT2L & !GNT1L;
    END ARBIT4M
```

The above described programs can be easily modified for five or more bus masters system in accordance with the principles of the present invention. For instance, devices such as PAL, GAL, FPGA AND EPLD can be used to program the functions of the priority resolve state machine 220 and the hand shake state machine 230.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

APPENDIX

```
*INPUT
    CLOCK, RESETL, FRAMEHL, IRDYL;
    REQ1L, REQ2L, REQ3L, REQ4L, REQ5L;
    CNT0, CNT1, CNT2;
*OUTPUT
    GNT1L, GNT2L, GNT3L, GNT4L, GNT5L;
    ST4, ST3, ST2, ST1, ST0;
    H, L, X, CLK,Z = 1,0, . . . x . . . , . . . c . . . , . . . z . . . ;
    PBBL macro ((FRAMEL & IRDYL));
EQUATIONS
    [ST4,ST3,ST2,ST1,ST0]·c = CLOCK;
    [ST4, ST3, ST2, ST1, ST0]·ar = !RESETL;
    [GNT5L, GNT4L, GNT3L, GNT2L, GNT1L]·c = CLOCK;
    [GNT5L, GNT4L, GNT3L, GNT2L, GNT1L]·pr = !RESETL;
TRUTH_TABLE ((PBBL, REQ5L, REQ4L, REQ3L, REQ2L, REQ1L, CNT2,
CNT1, CNT0, ST4, ST3, ST2, ST1, ST0, GNT5L, GNT4L, GNT3
L,GNT2L,GNT1L)
:>(ST4, ST3, ST2, ST1, ST0, GNT5L, GNT4L, GNT3L, GNT2L, GNT1L))
*  R R R R R         G G G G G         G G G G G
*  P B B E B B C C C  N N N N N         N N N N N
* [B Q Q Q Q Q N N N S S S S S T T T T T]:>[S S S S S T T T T T]
*  B 5 4 3 2 1 T T T T T T T T 5 4 3 2 1    T T T T T 5 4 3 2 1
*  L L L L L L 2 1 0 4 3 2 1 0 L L L L L    4 3 2 1 0 L L L L L
[X,1,1,1,1,1,X,X,X,0,0,0,0,0,1,1,1,1,1]:>[0,0,0,0,0,1,1,1,1,1];*wait for REQxL
[X,1,1,1,1,0,X,X,X,0,0,0,X,0,X,X,X,X,X]:>[0,0,1,0,0,1,1,1,1,0];*goto GT1
[X,1,1,1,0,1,X,X,X,0,0,0,X,0,X,X,X,X,X]:>[0,0,1,0,0,1,1,1,0,1];*goto GT2
[X,1,1,0,1,1,X,X,X,0,0,0,X,0,X,X,X,X,X]:>[0,1,0,0,0,1,1,0,1,1];*goto GT3
[X,1,0,1,1,1,X,X,X,0,0,0,X,0,X,X,X,X,X]:>[0,1,0,0,0,1,0,1,1,1];*goto GT4
[X,0,1,1,1,1,X,X,X,0,0,0,X,0,X,X,X,X,X]:>[1,0,0,0,0,0,1,1,1,1];*goto GT5
```

APPENDIX-continued

```
[X,0,0,0,0,0,0,0,0,0,0,X,0,X,X,X,X,X]:>[0,0,1,0,0,1,1,1,1,0];*goto GT1
[X,0,0,0,0,1,0,0,0,0,0,X,0,X,X,X,X,X]:>[0,0,1,0,0,1,1,1,0,1];*goto GT2
[X,0,0,0,1,0,0,0,0,0,0,X,0,X,X,X,X,X]:>[0,0,1,0,0,1,1,1,1,0];*goto GT1
[X,0,0,0,1,1,0,0,0,0,0,X,0,X,X,X,X,X]:>[0,1,0,0,0,1,1,0,1,1];*goto GT3
[X,0,0,1,0,0,0,0,0,0,0,X,0,X,X,X,X,X]:>[0,0,1,0,0,1,1,1,1,0];*goto GT1
[X,0,0,1,0,1,0,0,0,0,0,X,0,X,X,X,X,X]:>[0,0,1,0,0,1,1,1,0,1];*goto GT2
[X,0,0,1,1,0,0,0,0,0,0,X,0,X,X,X,X,X]:>[0,0,1,0,0,1,1,1,1,0];*goto GT1
list 1

[X,0,0,1,1,1,0,0,0,0,0,X,0,X,X,X,X,X]:>[0,1,0,0,0,1,0,1,1,1];*goto GT4
[X,0,1,0,0,0,0,0,0,0,0,X,0,X,X,X,X,X]:>[0,0,1,0,0,1,1,1,1,0];*goto GT1
[X,0,1,0,0,1,0,0,0,0,0,X,0,X,X,X,X,X]:>[0,0,1,0,0,1,1,1,1,1];*goto GT2
[X,0,1,0,1,0,0,0,0,0,0,X,0,X,X,X,X,X]:>[0,0,1,0,0,1,1,1,1,0];*goto GT1
[X,0,1,0,1,1,0,0,0,0,0,X,0,X,X,X,X,X]:>[0,1,0,0,0,1,1,0,1,1];*goto GT3
[X,0,1,1,0,0,0,0,0,0,0,X,0,X,X,X,X,X]:>[0,0,1,0,0,1,1,1,1,0];*goto GT1
[X,0,1,1,0,1,0,0,0,0,0,X,0,X,X,X,X,X]:>[0,0,1,0,0,2,1,1,0,1];*goto GT2
[X,0,1,1,1,0,0,0,0,0,0,X,0,X,X,X,X,X]:>[0,0,1,0,0,1,1,1,1,0];*goto GT1
[X,1,0,0,0,0,0,0,0,0,0,X,0,X,X,X,X,X]:>[0,0,1,0,0,1,2,2,1,0];*goto GT1
[X,1,0,0,0,1,0,0,0,0,0,X,0,X,X,X,X,X]:>[0,0,2,0,0,1,1,1,0,1];*goto GT2
[X,1,0,0,1,0,0,0,0,0,0,X,0,X,X,X,X,X]:>[0,0,1,0,0,1,1,1,1,0];*goto GT1
[X,1,0,0,1,1,0,0,0,0,0,X,0,X,X,X,X,X]:>[0,1,0,0,0,1,1,0,1,1];*goto GT3
[X,1,0,0,1,0,0,0,0,0,0,X,0,X,X,X,X,X]:>[0,0,1,0,0,1,1,1,1,0];*goto GT1
[X,1,0,0,1,1,0,0,0,0,0,X,0,X,X,X,X,X]:>[0,0,1,0,0,1,1,1,0,1];*goto GT2
[X,1,0,1,0,0,0,0,0,0,0,X,0,X,X,X,X,X]:>[0,0,1,0,0,1,1,1,1,0];*goto GT1
[X,1,1,0,0,0,0,0,0,0,0,X,0,X,X,X,X,X]:>[0,0,1,0,0,1,1,1,1,0];*goto GT1
[X,1,1,0,0,1,0,0,0,0,0,X,0,X,X,X,X,X]:>[0,0,1,0,0,1,1,1,1,0];*goto GT2
[X,1,1,1,0,0,0,0,0,0,0,X,0,X,X,X,X,X]:>[0,0,1,0,0,1,1,1,1,0];*goto GT1
[X,1,1,1,0,0,0,0,0,0,0,X,0,X,X,X,X,X]:>[0,0,1,0,0,1,1,1,1,0];*goto GT1
[Y,0,0,0,0,0,0,1,0,0,0,Y,0,Y,Y,Y,Y,Y]:>[0,0,1,0,0,1,1,1,0,1];*goto GT2
[X,0,0,0,0,1,0,0,1,0,0,X,0,X,X,X,X,X]:>[0,0,1,0,0,1,1,1,1,0,1];*goto GT2
[X,0,0,0,0,1,0,0,1,0,0,X,0,X,X,X,X,X]:>[0,0,1,0,0,1,1,1,1,0,1];*goto GT3
[X,0,0,0,1,0,0,0,1,0,0,X,0,X,X,X,X,X]:>[0,1,0,0,0,1,1,0,1,1];*goto GT3
[X,0,0,0,1,1,0,0,1,0,0,X,0,X,X,X,X,X]:>[0,1,0,0,0,1,1,0,1,1];*goto GT2
[X,0,0,1,0,0,0,0,1,0,0,X,0,X,X,X,X,X]:>[0,0,1,0,0,1,1,1,1,0,1];*goto GT2
[X,0,0,1,0,1,0,0,1,0,0,X,0,X,X,X,X,X]:>[0,0,0,0,0,1,1,1,0,1];*goto GT4
[X,0,0,1,1,1,0,0,1,0,0,X,0,X,X,X,X,X]:>[1,0,0,0,0,1,0,1,1,1];*goto GT4
[X,0,0,1,1,1,0,0,1,0,0,X,0,X,X,X,X,X]:>[0,1,0,0,0,1,0,1,1,1];*goto GT2
[X,0,1,0,0,0,0,0,1,0,0,X,0,X,X,X,X,X]:>[0,0,1,0,0,1,1,1,1,0,1];*goto GT2
[X,0,1,0,1,0,0,0,1,0,0,X,0,X,X,X,X,X]:>[0,0,1,0,0,1,1,1,0,1];*goto GT3
[X,0,1,0,1,1,0,0,1,0,0,X,0,X,X,X,X,X]:>[0,1,0,0,0,1,1,0,1,1];*goto GT3
[X,0,1,0,1,1,0,0,1,0,0,X,0,X,X,X,X,X]:>[0,1,0,0,0,1,1,0,1,1];*goto GT2
[X,0,1,1,0,0,0,0,1,0,0,X,0,X,X,X,X,X]:>[0,0,1,0,0,1,1,1,0,1];*goto GT2
[X,0,1,1,0,1,0,0,1,0,0,X,0,X,X,X,X,X]:>[1,0,0,0,0,0,1,1,1,1];*goto GT5
[X,1,0,0,0,0,0,0,1,0,0,X,0,X,X,X,X,X]:>[0,0,1,0,0,1,1,1,1,0,1];*goto GT2
[X,1,0,0,0,1,0,0,1,0,0,X,0,X,X,X,X,X]:>[0,0,1,0,0,1,1,1,0,1];*goto GT2
[X,1,0,0,1,0,0,0,1,0,0,X,0,X,X,X,X,X]:>[0,1,0,0,0,1,1,0,1,1];*goto GT3
[X,1,0,0,1,1,0,0,1,0,0,X,0,X,X,X,X,X]:>[0,1,0,0,0,1,1,0,1,1];*goto GT3
[X,1,0,1,0,0,0,0,1,0,0,X,0,X,X,X,X,X]:>[0,0,1,0,0,1,1,1,0,1];*goto GT2
[X,1,0,1,0,1,0,0,1,0,0,X,0,X,X,X,X,X]:>[0,0,1,0,0,1,1,1,0,1];*goto GT2
[X,1,0,1,1,0,0,0,1,0,0,X,0,X,X,X,X,X]:>[0,1,0,0,0,1,0,1,1,1];*goto GT4
[X,1,1,0,0,0,0,0,1,0,0,X,0,X,X,X,X,X]:>[0,0,1,0,0,1,1,1,1,0,1];*goto GT2
[X,1,1,0,0,1,0,0,1,0,0,X,0,X,X,X,X,X]:>[0,0,1,0,0,1,1,1,1,0,1];*goto GT2
[X,1,1,0,1,0,0,0,1,0,0,X,0,X,X,X,X,X]:>[0,1,0,0,0,1,2,0,1,1];*goto GT3
list 2

[X,1,1,1,0,0,0,0,1,0,0,X,0,X,X,X,X,X]:>[0,0,1,0,0,1,1,1,1,0,1];*goto GT2
[X,0,0,0,0,0,0,1,1,0,0,0,X,0,X,X,X,X,X]:>[0,1,0,0,0,1,1,0,1,1];*goto GT3
[X,0,0,0,0,1,0,1,1,0,0,X,0,X,X,X,X,X]:>[0,1,0,0,0,1,1,0,1,1];*goto GT3
[X,0,0,0,1,0,0,1,1,0,0,X,0,X,X,X,X,X]:>[0,1,0,0,0,1,1,0,1,1];*goto GT3
[X,0,0,0,1,1,0,1,1,0,0,X,0,X,X,X,X,X]:>[0,1,0,0,0,1,1,0,1,1];*goto GT3
[X,0,0,1,0,0,0,1,1,0,0,X,0,X,X,X,X,X]:>[0,1,0,0,0,1,0,1,1,1];*goto GT4
[X,0,0,1,0,1,0,1,1,0,0,X,0,X,X,X,X,X]:>[0,1,0,0,0,1,0,1,1,1];*goto GT4
[X,0,0,1,1,0,0,1,1,0,0,X,0,X,X,X,X,X]:>[0,1,0,0,0,1,0,1,1,1];*goto GT4
[X,0,0,1,1,1,0,1,1,0,0,X,0,X,X,X,X,X]:>[0,1,0,0,0,1,0,1,1,1];*goto GT4
[X,0,1,0,0,0,0,1,1,0,0,X,0,X,X,X,X,X]:>[0,1,0,0,0,1,1,0,1,1];*goto GT3
[X,0,1,0,0,1,0,1,1,0,0,X,0,X,X,X,X,X]:>[0,1,0,0,0,1,1,0,1,1];*goto GT3
[X,0,1,0,1,0,0,1,1,0,0,X,0,X,X,X,X,X]:>[0,1,0,0,0,1,1,0,1,1];*goto GT3
[X,0,1,0,1,1,0,1,1,0,0,X,0,X,X,X,X,X]:>[0,1,0,0,0,1,1,0,1,1];*goto GT3
[X,0,1,1,0,0,0,1,1,0,0,X,0,X,X,X,X,X]:>[1,0,0,0,0,0,1,1,1,1];*goto GT3
[X,0,1,1,0,1,0,1,1,0,0,X,0,X,X,X,X,X]:>[1,0,0,0,0,0,1,1,1,1];*goto GT5
[X,1,0,0,0,0,0,1,1,0,0,X,0,X,X,X,X,X]:>[0,1,0,0,0,1,1,1,1,1];*goto GT5
[X,0,1,1,1,0,0,1,1,0,0,X,0,X,X,X,X,X]:>[1,0,0,0,0,0,1,1,1,1];*goto GT5
[X,1,0,0,0,1,0,1,1,0,0,X,0,X,X,X,X,X]:>[0,1,0,0,0,1,1,0,1,1];*goto GT3
[X,1,0,0,1,0,0,1,1,0,0,X,0,X,X,X,X,X]:>[0,1,0,0,0,1,1,0,1,1];*goto GT3
[X,1,0,0,1,1,0,1,1,0,0,X,0,X,X,X,X,X]:>[0,1,0,0,0,1,1,0,1,1];*goto GT3
[X,1,0,1,0,0,0,1,1,0,0,X,0,X,X,X,X,X]:>[0,1,0,0,0,1,0,1,1,1];*goto GT4
[X,1,0,1,0,1,0,1,1,0,0,X,0,X,X,X,X,X]:>[0,1,0,0,0,1,0,1,1,1];*goto GT4
[X,1,0,1,1,0,0,1,1,0,0,X,0,X,X,X,X,X]:>[0,1,0,0,0,1,0,1,1,1];*goto GT4
[X,1,1,0,0,0,0,1,1,0,0,X,0,X,X,X,X,X]:>[0,1,0,0,0,1,1,0,1,1];*goto GT3
```

APPENDIX-continued

[X,1,1,0,0,1,0,1,1,0,0,0,X,0,X,X,X,X,X]:>[0,1,0,0,0,1,1,0,1,1];*goto GT3
[X,1,1,0,1,0,0,1,1,0,0,0,X,0,X,X,X,X,X]:>[0,1,0,0,0,1,1,0,1,1];*goto GT3
[X,1,1,1,0,0,0,1,1,0,0,0,X,0,X,X,X,X,X]:>[0,0,1,0,0,1,1,1,1,0];*goto GT1
[X,0,0,0,0,0,1,1,1,0,0,0,X,0,X,X,X,X,X]:>[0,1,0,0,0,1,0,1,1,1];*goto GT4
[X,0,0,0,0,1,1,1,1,0,0,0,X,0,X,X,X,X,X]:>[0,1,0,0,0,1,0,1,1,1];*goto GT4
[X,0,0,0,1,0,1,1,1,0,0,0,X,0,X,X,X,X,X]:>[0,1,0,0,0,1,0,1,1,1];*goto GT4
[X,0,0,0,1,1,1,1,1,0,0,0,X,0,X,X,X,X,X]:>[0,1,0,0,0,1,0,1,1,1];*goto GT4
[X,0,0,1,0,0,1,1,1,0,0,0,X,0,X,X,X,X,X]:>[0,1,0,0,0,1,0,1,1,1];*goto GT4
[X,0,0,1,0,1,1,1,1,0,0,0,X,0,X,X,X,X,X]:>[0,1,0,0,0,1,0,1,1,1];*goto GT4
[X,0,0,1,1,0,1,1,1,0,0,0,X,0,X,X,X,X,X]:>[0,1,0,0,0,1,0,1,1,1];*goto GT4
[X,0,0,1,1,1,1,1,1,0,0,0,X,0,X,X,X,X,X]:>[0,1,0,0,0,1,0,1,1,1];*goto GT4
[X,0,1,0,0,0,1,1,1,0,0,0,X,0,X,X,X,X,X]:>[1,0,0,0,0,0,1,1,1,1];*goto GT5
[X,0,1,0,0,1,1,1,1,0,0,0,X,0,X,X,X,X,X]:>[1,0,0,0,0,0,1,1,1,1];*goto GT5
[X,0,1,0,1,0,1,1,1,0,0,0,X,0,X,X,X,X,X]:>[1,0,0,0,0,0,1,1,1,1];*goto GT5
[X,0,1,0,1,1,1,1,1,0,0,0,X,0,X,X,X,X,X]:>[1,0,0,0,0,0,1,1,1,1];*goto GT5
[X,0,1,1,0,0,1,1,1,0,0,0,X,0,X,X,X,X,X]:>[1,0,0,0,0,0,1,1,1,1];*goto GT5
[X,0,1,1,0,1,1,1,1,0,0,0,X,0,X,X,X,X,X]:>[1,0,0,0,0,0,1,1,1,1];*goto GT5
[X,0,1,1,1,0,1,1,1,0,0,0,X,0,X,X,X,X,X]:>[1,0,0,0,6,6,1,1,1,1];*goto GT5
[X,1,0,0,0,0,1,1,1,0,0,0,X,0,X,X,X,X,X]:>[0,1,0,0,0,1,0,1,1,1];*goto GT4
list 3

[X,1,0,0,0,1,1,1,1,0,0,0,X,0,X,X,X,X,X]:>[0,1,0,0,0,1,0,1,1,1];*goto GT4
[X,1,0,0,1,0,1,1,1,0,0,0,X,0,X,X,X,X,X]:>[0,1,0,0,0,1,0,1,1,1];*goto GT4
[X,1,0,0,1,1,1,1,1,0,0,0,X,0,X,X,X,X,X]:>[0,1,0,0,0,1,0,1,1,1];*goto GT4
[X,1,0,1,0,0,1,1,1,0,0,0,X,0,X,X,X,X,X]:>[0,1,0,0,0,1,0,1,1,1];*goto GT4
[X,1,0,1,0,1,1,1,1,0,0,0,X,0,X,X,X,X,X]:>[0,1,0,0,0,1,0,1,1,1];*goto GT4
[X,1,0,1,1,0,1,1,1,0,0,0,X,0,X,X,X,X,X]:>[0,1,0,0,0,1,0,1,1,1];*goto GT4
[X,1,1,0,0,0,1,1,1,0,0,0,X,0,X,X,X,X,X]:>[0,0,1,0,0,1,1,1,1,0];*goto GT1
[X,1,1,0,0,1,1,1,1,0,0,0,X,0,X,X,X,X,X]:>[0,0,1,0,0,1,1,1,1,0,1];*goto GT2
[X,1,1,0,1,0,1,1,1,0,0,0,X,0,X,X,X,X,X]:>[0,0,1,0,0,1,1,1,1,1,0];*goto GT1
[X,1,1,1,0,0,1,1,1,0,0,0,X,0,X,X,X,X,X]:>[0,0,1,0,0,1,1,1,1,1,0];*goto GT1
[X,0,0,0,0,0,1,1,0,0,0,0,X,0,X,X,X,X,X]:>[1,0,0,0,0,0,1,1,1,1];*goto GT4
[X,0,0,0,0,1,1,1,0,0,0,0,X,0,X,X,X,X,X]:>[1,0,0,0,0,0,1,1,1,1];*goto GT5
[X,0,0,0,1,0,1,1,0,0,0,0,X,0,X,X,X,X,X]:>[1,0,0,0,0,0,1,1,1,1];*goto GT5
[X,0,0,0,1,1,1,1,0,0,0,0,X,0,X,X,X,X,X]:>[1,0,0,0,0,0,1,1,1,1];*goto GT5
[X,0,0,1,0,0,1,1,0,0,0,0,X,0,X,X,X,X,X]:>[1,0,0,0,0,0,1,1,1,1];*goto GT5
[X,0,0,1,0,1,1,1,0,0,0,0,X,0,X,X,X,X,X]:>[1,0,0,0,0,0,1,1,1,1];*goto GT5
[X,0,0,1,1,0,1,1,0,0,0,0,X,0,X,X,X,X,X]:>[1,0,0,0,0,0,1,1,1,1];*goto GT5
[X,0,0,1,1,1,1,1,0,0,0,0,X,0,X,X,X,X,X]:>[1,0,0,0,0,0,1,1,1,1];*goto GT5
[X,0,1,0,0,0,1,1,0,0,0,0,X,0,X,X,X,X,X]:>[1,0,0,0,0,0,1,1,1,1];*goto GT5
[X,0,1,0,0,1,1,1,0,0,0,0,X,0,X,X,X,X,X]:>[1,0,0,0,0,0,1,1,1,1];*goto GT5
[X,0,1,0,1,0,1,1,0,0,0,0,X,0,X,X,X,X,X]:>[1,0,0,0,0,0,1,1,1,1];*goto GT5
[X,0,1,0,1,1,1,1,0,0,0,0,X,0,X,X,X,X,X]:>[1,0,0,0,0,0,1,1,1,1];*goto GT5
[X,0,1,1,0,0,1,1,0,0,0,0,X,0,X,X,X,X,X]:>[1,0,0,0,0,0,1,1,1,1];*goto GT5
[X,0,1,1,0,1,1,1,0,0,0,0,X,0,X,X,X,X,X]:>[1,0,0,0,0,0,1,1,1,1];*goto GT5
[X,0,1,1,1,0,1,1,0,0,0,0,X,0,X,X,X,X,X]:>[1,0,0,0,0,0,1,1,1,1];*goto GT5
[X,1,0,0,0,0,1,1,0,0,0,0,X,0,X,X,X,X,X]:>[0,0,1,0,0,1,1,1,1,0];*goto GT1
[X,1,0,0,0,1,1,1,0,0,0,0,X,0,X,X,X,X,X]:>[0,0,1,0,0,1,1,1,0,1];*goto GT2
[X,1,0,0,1,0,1,1,0,0,0,0,X,0,X,X,X,X,X]:>[0,0,1,0,0,1,1,1,1,0];*goto GT1
[X,1,0,0,1,1,1,1,0,0,0,0,X,0,X,X,X,X,X]:>[0,1,0,0,0,1,1,0,1,1];*goto GT3
[X,1,0,1,0,0,1,1,0,0,0,0,X,0,X,X,X,X,X]:>[0,0,1,0,0,1,1,1,1,0];*goto GT1
[X,1,0,1,0,1,1,1,0,0,0,0,X,0,X,X,X,X,X]:>[0.0.1.0.0.1.1.1.0.1];*goto GT2
[X,1,0,1,1,0,1,1,0,0,0,0,X,0,X,X,X,X,X]:>[0,0,1,0,0,1,1,1,1,0];*goto GT1
[X,1,1,0,0,0,1,1,0,0,0,0,X,0,X,X,X,X,X]:>[0,0,1,0,0,1,1,1,1,0];*goto GT1
[X,1,1,0,0,1,1,1,0,0,0,0,X,0,X,X,X,X,X]:>[0,0,1,0,0,1,1,1,0,1];*goto GT2
[X,1,1,0,1,0,1,1,0,0,0,0,X,0,X,X,X,X,X]:>[0,0,1,0,0,1,1,1,1,0];*goto GT1
[X,1,1,1,0,0,1,1,0,0,0,0,X,0,X,X,X,X,X]:>[0,0,1,0,0,1,1,1,1,0];*goto GT1
[0,X,X,X,X,X,X,X,0,0,1,0,0,1,1,1,1,0]:>[0,0,1,0,0,1,1,1,1,0];*GT1_0, wait on PBBL=1 in GT1_0
[1,X,X,X,X,X,X,X,0,0,1,0,0,1,1,1,1,0]:>[0,0,0,0,1,1,1,1,1,0];*GT1_0, goto GT1_1
[1,X,X,X,X,X,X,X,0,0,0,0,1,1,1,1,1,0]:>[0,0,0,0,1,1,1,1,1,0];*GT1_1, wait on PBBL=0
list 4

[0,X,X,X,X,X,X,X,0,0,0,0,1,1,1,1,1,0]:>[0,0,0,1,0,1,1,1,1,0];*GT1_1, goto GT1_WAIT
[X,1,1,1,1,1,X,X,X,0,0,0,1,0,1,1,1,1,0]:>[0,0,0,1,0,1,1,1,1,0];*GT1_WAIT
[0,X,X,X,X,X,X,X,0,0,1,0,0,1,1,1,0,1]:>[0,0,1,0,0,1,1,1,0,1];*GT2_0, wait on PBBL=1 in GT2_0
[1,X,X,X,X,X,X,X,0,0,1,0,0,1,1,1,0,1]:>[0,0,0,0,1,1,1,1,0,1];*GT2_0, goto GT2_1
[1,X,X,X,X,X,X,X,0,0,0,0,1,1,1,1,0,1]:>[0,0,0,0,1,1,1,1,0,1];*GT2_1, wait on PBBL=0
[0,X,X,X,X,X,X,X,0,0,0,0,1,1,1,1,0,1]:>[0,0,0,1,0,1,1,1,0,1];*GT2_1, goto GT2_WAIT
[X,1,1,1,1,1,X,X,X,0,0,0,1,0,1,1,1,0,1,1]:>[0,0,0,1,0,1,1,1,0,1];*GT2_WAIT
[0,X,X,X,X,X,X,X,0,1,0,0,0,1,1,0,1,1]:>[0,1,0,0,0,1,1,0,1,1];*GT3_0, wait on PBBl=1 in GT3_0
[1,X,X,X,X,X,X,X,0,1,0,0,0,1,1,0,1,1]:>[0,0,0,0,1,1,1,0,1,1];*GT3_0, goto GT3_1
[1,X,X,X,X,X,X,X,0,0,0,0,1,1,1,0,1,1]:>[0,0,0,0,1,1,1,0,1,1];*GT3_1, wait on PBBL=0
[0,X,X,X,X,X,X,X,0,0,0,0,1,1,1,0,1,1]:>[0,0,0,1,0,1,1,0,1,1];*GT3_1, goto GT3_WAIT
[X,1,1,1,1,1,X,X,X,0,0,0,1,0,1,0,1,1,1]:>[0,0,0,1,0,1,1,0,1,1];*GT3_WAIT
[0,X,X,X,X,X,X,X,0,1,0,0,0,1,0,1,1,1]:>[0,1,0,0,0,1,0,1,1,1];*GT4_0, wait on PBBL=1 in GT4_0

APPENDIX-continued

```
[1,X,X,X,X,X,X,X,X,0,1,0,0,0,1,0,1,1,1]:>[0,0,0,0,1,1,0,1,1,1];*GT4_0, goto GT$_1
[1,X,X,X,X,X,X,X,X,0,0,0,0,1,1,0,1,1,1]:>[0,0,0,0,1,1,0,1,1,1];*GT4_1, wait on PBBL=0
[0,X,X,X,X,X,X,X,X,0,0,0,0,1,1,0,1,1,1]:>[0,0,0,1,0,1,0,1,1,1];*GT4_1, goto GT4_WAIT
[X,1,1,1,1,1,X,X,X,0,0,0,1,0,1,0,1,1,1]:>[0,0,0,1,0,1,0,1,1,1];*GT4_WAIT
[0,X,X,X,X,X,X,X,X,1,0,0,0,0,0,1,1,1,1]:>[1,0,0,0,0,0,1,1,1,1];*GT5_0, wait on PBBL=1 in GT5_0
[1,X,X,X,X,X,X,X,X,1,0,0,0,0,0,1,1,1,1]:>[0,0,0,0,1,0,1,1,1,1];*GT5_0, goto GT5_1
[1,X,X,X,X,X,X,X,X,0,0,0,0,1,0,1,1,1,1]:>[0,0,0,0,1,0,1,1,1,1];*GT5_1, wait on PBBL=0
[0,X,X,X,X,X,X,X,X,0,0,0,0,1,0,1,1,1,1]:>[0,0,0,1,0,0,1,1,1,1];*GT5_1, goto GT5_WAIT
[X,1,1,1,1,X,X,X,0,0,0,1,0,0,1,1,1,1]:>[0,0,0,1,0,0,1,1,1,1];*GT5_WAIT
END
```

What is claimed is:

1. A bus control method, comprising the steps of:

using a central processing unit, processing and manipulating data being transmitted to a computer system using a first PCI bus, a second PCI bus and an EISA/ISA bus;

using a first PCI bus bridge, changing structure of bus signals from bus masters to be transmitted through the first PCI bus;

using a second PCI bus bridge, changing structure of bus signals from bus masters to be transmitted through the second PCI bus;

using an EISA/ISA bus bridge, changing structure of bus signals from bus masters to be transmitted through the EISA/ISA bus;

using a first arbiter, receiving a first plurality of request signals requesting an authority to use the first PCI bus from the bus masters to be transmitted through the first PCI bus;

using the first arbiter, selecting a first bus master from the bus masters to be transmitted through the first PCI bus;

using the first arbiter, generating a first grant signal to authorize the first bus master to use the first PCI bus; and using a second arbiter, receiving a second plurality of request signals requesting an authority to use the second PCI bus from the bus masters to be transmitted through the second PCI bus;

using the second arbiter, selecting a second bus master from the bus masters to be transmitted through the second PCI bus; and using the second arbiter, generating a second grant signal to authorize the second bus master to use the second PCI bus, wherein the second arbiter comprises:

an edge detecting state machine detecting whether the second PCI bus is accessed by a bus master, and generating a frame signal having a logic state in dependence upon an access condition of the second PCI bus;

a priority resolve state machine receiving the frame signal and producing priority values determining an order of bus masters to use the second PCI bus, the priority values being changed according to the frame signal; and a hand shake state machine generating and transmitting the second grant signal to grant an authority to use the second PCI bus to the bus masters to be transmitted through the second PCI bus according to the priority values.

2. The bus control method according to claim 1, wherein the edge detecting state machine changes states according to changes of the frame signal.

3. The bus control method according to claim 1, wherein the priority resolve state machine determines the order of the bus masters to be transmitted through the second PCI bus to use the second PCI bus by determining according to round robin.

4. The bus control method according to claim 3, wherein the priority resolve state machine changes states thereof according to the order of the bus masters to be transmitted through the second PCI bus to use the second PCI bus, and produces the priority values corresponding to states of the bus masters to be transmitted through the second PCI bus.

5. The bus control method according to claim 1, wherein the priority resolve state machine determines the order of the bus masters to be transmitted through the second PCI bus to use the second PCI bus by determining according to fixed priority.

6. The bus control method according to claim 1, wherein the priority resolve state machine determines the order of the bus masters to be transmitted through the second PCI bus to use the second PCI bus by determining according to least recently used.

7. A bus control system, comprising:

a plurality of bus masters;

a central processing unit for processing and manipulating data transmitted to a computer system using a first PCI bus, a second PCI bus and an EISA/ISA bus;

a first PCI bus bridge for changing structure of bus signals from bus masters to be transmitted through the first PCI bus;

a second PCI bus bridge for changing structure of bus signals from bus masters to be transmitted through the second PCI bus;

an EISA/ISA bus bridge for changing structure of bus signals from bus masters to be transmitted through the EISA/ISA bus;

a first arbiter for receiving a first plurality of request signals requesting an authority to use the first PCI bus from the bus masters to be transmitted through the first PCI bus, for selecting a first bus master from the bus masters to be transmitted through the first PCI bus, and for generating a first grant signal to authorize the first bus master to use the first PCI bus; and a second arbiter for receiving a second plurality of request signals requesting an authority to use the second PCI bus from the bus masters to be transmitted through the second PCI bus, for selecting a second bus master from the bus masters to be transmitted through the second PCI bus, and for generating a second grant signal to authorize the second bus master to use the second PCI bus, wherein the second arbiter comprises:

an edge detecting state machine for detecting whether the second PCI bus is accessed by a bus master, and for generating a frame signal having a logic state in dependence upon an access condition of the second PCI bus;

a priority resolve state machine for receiving the frame signal and for producing priority values determining an order of the bus masters to be transmitted through the second PCI bus to use the second PCI bus, the priority values being changed according to the frame signal; and a hand shake state machine for generating and for transmitting the second grant signal to grant an authority to use the second PCI bus to the bus masters to be transmitted through the second PCI bus according to the priority values.

8. The bus control system according to claim 7, wherein the edge detecting state machine changes states according to changes of the frame signal.

9. The bus control system according to claim 7, wherein the priority resolve state machine determines the order of the bus masters to be transmitted through the second PCI bus to use the second PCI bus by determining according to round robin.

10. The bus control system according to claim 9, wherein the priority resolve state machine changes states thereof according to the order of the bus masters to be transmitted through the second PCI bus to use the second PCI bus, and produces the priority values corresponding to states of the bus masters to be transmitted through the second PCI bus.

11. The bus control system according to claim 7, wherein the priority resolve state machine determines the order of the bus masters to be transmitted through the second PCI bus to use the second PCI bus by determining according to fixed priority.

12. The bus control system according to claim 7, wherein the priority resolve state machine determines the order of the bus masters to be transmitted through the second PCI bus to use the second PCI bus by determining according to least recently used.

13. A PCI bus system, comprising:
a first PCI bus;
a second PCI bus;
a first arbiter for receiving a first plurality of request signals requesting an authority to use the first PCI bus from bus masters to be transmitted through the first PCI bus, and for authorizing a bus master to be transmitted through the first PCI bus to use the first PCI bus; and a second arbiter for receiving a second plurality of request signals requesting an authority to use the second PCI bus from bus masters to be transmitted through the second PCI bus, and for authorizing a bus master to be transmitted through the second PCI bus to use the second PCI bus, wherein the second arbiter comprises:

an edge detecting state machine for detecting whether the second PCI bus is accessed by a bus master, and for generating a frame signal having a logic state in dependence upon an access condition of the second PCI bus;

a priority resolve state machine for receiving the frame signal and for producing priority values determining an order of the bus masters to be transmitted through the second PCI bus to use the second PCI bus, the priority values being changed according to the frame signal; and a hand shake state machine for generating and for transmitting a grant signal to grant an authority to use the second PCI bus to the bus masters to be transmitted through the second PCI bus according to the priority values.

14. The PCI bus system according to claim 13, wherein the edge detecting state machine changes states according to changes of the frame signal.

15. The PCI bus system according to claim 13, wherein the priority resolve state machine determines the order of the bus masters to be transmitted through the second PCI bus to use the second PCI bus by determining according to round robin.

16. The PCI bus system according to claim 15, wherein the priority resolve state machine changes states thereof according to the order of the bus masters to be transmitted through the second PCI bus to use the second PCI bus, and produces the priority values corresponding to states of the bus masters to be transmitted through the second PCI bus.

17. The PCI bus system according to claim 13, wherein the priority resolve state machine determines the order of the bus masters to be transmitted through the second PCI bus to use the second PCI bus by determining according to fixed priority.

18. The PCI bus system according to claim 13, wherein the priority resolve state machine determines the order of the bus masters to be transmitted through the second PCI bus to use the second PCI bus by determining according to least recently used.

* * * * *